US010647294B2

(12) United States Patent
Santiano et al.

(10) Patent No.: US 10,647,294 B2
(45) Date of Patent: May 12, 2020

(54) REMOTELY GRANTING VEHICLE PERMISSIONS

(71) Applicant: Faraday & Future Inc., Gardena, CA (US)

(72) Inventors: Julie Ann Santiano, Los Angeles, CA (US); Chris Wang, Los Angeles, CA (US); Misia K. Clive Groszek, Los Angeles, CA (US); Ji Yong Park, Chino, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 0 days.

(21) Appl. No.: 15/691,537

(22) Filed: Aug. 30, 2017

(65) Prior Publication Data

US 2018/0186333 A1   Jul. 5, 2018

Related U.S. Application Data

(60) Provisional application No. 62/382,080, filed on Aug. 31, 2016.

(51) Int. Cl.
B60R 25/24 (2013.01)
G06F 21/35 (2013.01)
H04W 4/40 (2018.01)
H04W 12/00 (2009.01)
(Continued)

(52) U.S. Cl.
CPC .............. B60R 25/24 (2013.01); G06F 21/35 (2013.01); H04L 67/1097 (2013.01); H04W 4/40 (2018.02); H04W 12/0027 (2019.01); H04W 12/08 (2013.01); H04L 67/10 (2013.01)

(58) Field of Classification Search
CPC ... B60R 25/24; B60R 25/241; B60R 25/2081; B60R 25/32; B60R 25/33; G06F 21/35; G07C 9/00007; G07C 9/00015; G07C 9/00023; G07C 2009/0042;
(Continued)

(56) References Cited

U.S. PATENT DOCUMENTS 5,557,254 A * 9/1996 Johnson ................ B60R 25/102
340/426.19
6,225,890 B1 * 5/2001 Murphy ................ B60R 25/012
307/10.5
(Continued)

Primary Examiner — Edwin C Holloway, III
(74) Attorney, Agent, or Firm — Veros Legal Solutions, LLP

(57) ABSTRACT

A system for remotely granting vehicle permissions over a cloud network may be performed by one or more processors connected to the cloud network. The one or more processors may generate an electronic key for permitting one or more registered users to access and operate a vehicle, and the electronic key may include a plurality of permission settings. The one or more processors may provide the electronic key to the one or more registered users through the cloud network, receive at least one update from the vehicle or the one or more registered users through the cloud network, modify at least one permission setting associated with the electronic key based on the received update, and provide the modified permission setting to the one or more registered users through the cloud network. The system may further include a storage device configured to store the electronic key and the permission settings.

20 Claims, 13 Drawing Sheets

(51) Int. Cl.
*H04L 29/08* (2006.01)
*H04W 12/08* (2009.01)

(58) Field of Classification Search
CPC .......... G07C 2009/00476; H04L 63/00; H04L 63/08; H04L 67/1097; H04L 67/10
USPC ............................................... 340/5.61, 5.72
See application file for complete search history.

(56) References Cited

U.S. PATENT DOCUMENTS

| | | | | |
|---|---|---|---|---|
| 2011/0264304 | A1* | 10/2011 | Burzio | B60R 25/04 |
| | | | | 701/2 |
| 2012/0280783 | A1* | 11/2012 | Gerhardt | G07C 9/00309 |
| | | | | 340/5.6 |
| 2013/0305319 | A1* | 11/2013 | Matthews, III | H04L 63/08 |
| | | | | 726/4 |
| 2014/0266573 | A1* | 9/2014 | Sullivan | G07C 9/00571 |
| | | | | 340/4.32 |
| 2015/0287256 | A1* | 10/2015 | Davis | G05B 19/02 |
| | | | | 340/5.25 |
| 2016/0148450 | A1* | 5/2016 | Ohshima | B60R 25/2018 |
| | | | | 340/5.61 |

* cited by examiner

View Activity
Key in use since March 17, 2016

Today July 7

John Doe

| 8:43 pm | ○ | Unlocked |
| 8:45 pm | ○ | 123 Street Lane, Los Angeles, CA |
| | | 30 min | 39.7 mi | 85 mph |
| 9:15 pm | ○ | 789 First Boulevard, Los Angeles, CA |
| 9:50 pm | ○ | Locked |
| Summary | — | 30 min. | 39.7 mi | 85 mph | 8:43 pm – 9:50 pm |

July 01

Jane Doe

| 7:10 pm | ○ | Unlocked |
| 7:43 pm | ○ | 123 Street Lane, Los Angeles, CA |
| | | 30 min | 39.7 mi |
| 8:13 pm | ○ | 789 First Boulevard, Los Angeles, CA |
| 8:50 pm | ○ | Locked |
| Summary | — | 30 min. | 39.7 mi | 7:10 pm – 8:50 pm |

FIG. 10

REMOTELY GRANTING VEHICLE PERMISSIONS

CROSS-REFERENCE TO RELATED APPLICATIONS

This application claims the benefit of U.S. Provisional Application No. 62/382,080, filed Aug. 31, 2016, the entirety of which is hereby incorporated by reference.

TECHNICAL FIELD

The present disclosure generally relates to systems and methods for granting limited permissions to another person to access or operate a vehicle, and more specifically, for allowing a vehicle owner to remotely control vehicle permissions by use of an electronic key.

BACKGROUND

A vehicle owner may wish to lend his or her vehicle to an authorized user, such as a mechanic, valet, friend, or family member, and may be required to transfer a physical key. Providing a physical key typically provides an authorized user with full access and operation of a vehicle, including but not limited to driving the vehicle, accessing the glove compartment, and accessing the trunk.

Although lending a vehicle with a physical key typically enables an authorized user to use the vehicle, there are some shortcomings. For example, use of a physical key requires the owner to physically transfer the key to the authorized user, which may be inconvenient when the owner and authorized user reside in different locations. Moreover, use of a physical key permits the authorized user complete and unlimited autonomy to access vehicle compartments, and to operate the vehicle at any speed, for any duration, and in any location without any restrictions or adherence to the owner's preferences. Furthermore, smart keys and keyless authorization mechanisms are similarly unable to prevent an authorized user from unwanted access to vehicle functions or operations.

Therefore, there is a need for electronic or virtual keys to enable an owner to set and control permissions for a vehicle and to monitor vehicle usage remotely. However, existing electronic keys may not allow an owner to modify a vehicle permission or track an authorized user's vehicle usage in real-time. Furthermore, existing electronic keys may not be tailored to user-specific permissions or operable in a cloud network. Therefore, it may be desirable to implement electronic key software to facilitate distribution, modification, and control of electronic keys according to an owner's preferences and assigned user permissions in a cloud environment.

SUMMARY

One aspect of the present disclosure is directed to a system for remotely granting vehicle permissions over a cloud network. The system may include one or more processors connected to the cloud network. The one or more processors may generate an electronic key for permitting one or more registered users to access and operate a vehicle, and the electronic key may include a plurality of permission settings. The one or more processors may provide the electronic key to the one or more registered users through the cloud network, receive at least one update from the vehicle or the one or more registered users through the cloud network, modify at least one permission setting associated with the electronic key based on the received update, and provide the modified permission setting to the one or more registered users through the cloud network. The system may also include a storage device configured to store the electronic key and the permission settings.

One aspect of the present disclosure is directed to a method for remotely granting vehicle permissions over a cloud network. The method may be performed by one or more processors connected to the cloud network. The method may include generating an electronic key for permitting one or more registered users to access and operate a vehicle, and the electronic key may include a plurality of permission settings. The method may further include providing the electronic key to the one or more registered users through the cloud network, receiving at least one update from the vehicle or the one or more registered users through the cloud network, modifying at least one permission setting associated with the electronic key based on the received update, providing the modified permission setting to the one or more registered users through the cloud network, and storing the electronic key and the permission settings.

Yet another aspect of the present disclosure is directed to a non-transitory computer-readable medium. The non-transitory computer-readable medium may store instructions executable by one or more processors connected to the cloud network to perform a method. The method may include generating an electronic key for permitting one or more registered users to access and operate a vehicle, and the electronic key may include a plurality of permission settings. The method may further include providing the electronic key to the one or more registered users through the cloud network, receiving at least one update from the vehicle or the one or more registered users through the cloud network, modifying at least one permission setting associated with the electronic key based on the received update, providing the modified permission setting to the one or more registered users through the cloud network, and storing the electronic key and the permission settings.

BRIEF DESCRIPTION OF THE DRAWINGS

FIG. 5 is a diagrammatic illustration of exemplary graphical user interfaces showing a permission tab and a history tab of an electronic key for editing;

FIG. 10 is a diagrammatic illustration of an exemplary graphical user interface showing activities associated with an electronic key;

DETAILED DESCRIPTION

Figure 1:
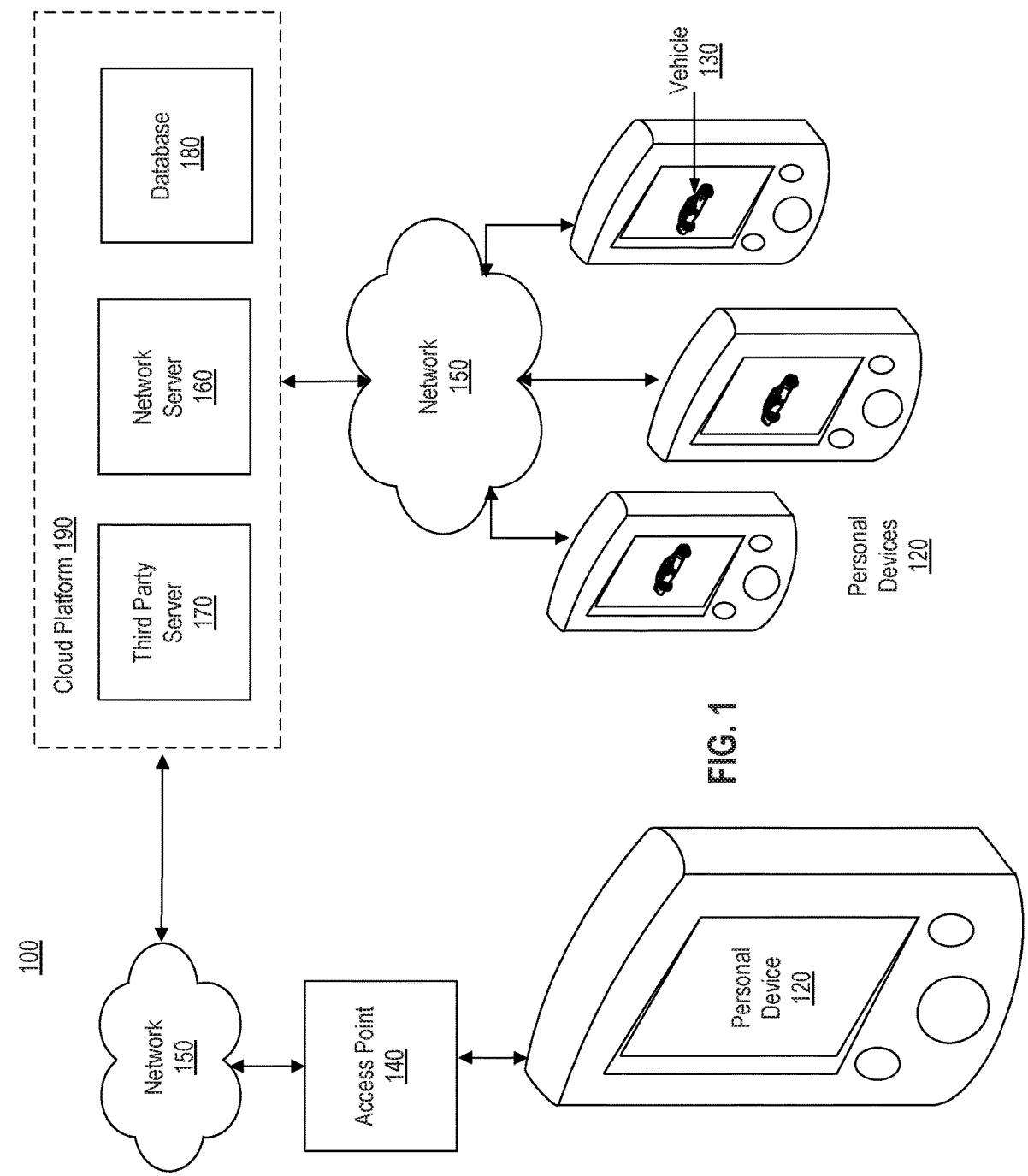
FIG. 1 is a schematic block diagram illustrating an exemplary system for remotely granting vehicle permissions over a cloud network, in accordance with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

FIG. 1 is a schematic block diagram illustrating an exemplary system 100 for remotely granting vehicle permissions over a cloud network, in accordance with the disclosed embodiments. As illustrated in FIG. 1, system 100 may include one or more personal devices 120, vehicle 130, and network 150.

Personal devices 120 may include personal computing devices such as, for example, desktop computers, notebook computers, mobile devices, tablets, smartphones, wearable devices such as smart watch, smart bracelet, and Google Glass™, and any other personal devices. Personal devices 120 may communicate with other parts of system 100 through network 150. Personal devices 120 may also include software and executable programs configured to communicate with network 150 and send electronic keys to one or more users operating a vehicle 130. Other software and executable programs are contemplated.

Vehicle 130 may have any body style, such as a sports car, a coupe, a sedan, a pick-up truck, a station wagon, a sports utility vehicle (SUV), a minivan, or a conversion van. Vehicle 130 may be an electric vehicle, a fuel cell vehicle, a hybrid vehicle, or a conventional internal combustion engine vehicle. Vehicle 130 may be configured to be operated by a driver occupying vehicle 130, remotely controlled by a vehicle owner operating an electronic key application executed on a personal device 120, and/or autonomously controlled via advanced driver assistance systems (ADAS) and network server 150.

System 100 may allow for one or more personal devices 120 to transfer electronic keys and associated with an electronic key application (e.g., illustrated in FIGS. 4-13) over network 150 to cloud platform 190 and/or vehicle 130. Personal devices 120 may be mobile or stationary (not shown), such as located in residential premises and non-residential premises and configured to communicate with network 150. Personal devices 120 may connect to network 150 through Wi-Fi or wireless access points (WAP). Bluetooth® or similar wireless technology may be contemplated. Network 150 may include a wireless network, such as a cellular network, a satellite network, the Internet, or a combination of these (or other) networks that are used to transport data. Furthermore, network 150 may be a wired network, such as an Ethernet network. Network 150 may transmit, for example, authentication services that enable personal devices 120 to access information, and vehicle permission instructions according to authorized user data, vehicle data, owner information, and associated metadata.

In the exemplary system 100, personal devices 120 and vehicle 130 may communicate with one or more servers in cloud platform 190 through network 150. Cloud platform 190 may comprise one or more network servers 160, third party servers 170, and/or databases 180. Servers 160 and 170 may provide cloud services for users and their personal devices 120. For example, a cloud-based architecture may be implemented comprising a distributed portion that executes at another location in network 150 and a corresponding cloud portion that executes on a network server 160 in cloud platform 190. Servers in cloud platform 190 may also communicate with a transceiver (as further referenced in FIG. 3) of vehicle 130 over network 150 using appropriate cloud-based communication protocols, such as SOAP or REST and/or other protocols that would be known to those skilled in the art. Such communication may allow for remote control of vehicle 130 by, for example, a vehicle owner operating an electronic key application executed on a personal device 120.

As shown in FIG. 1, network 150 may be accessible to network servers 160, third party servers 170, and databases 180 in cloud platform 190, for sending and receiving of information, such as authorized user data, vehicle data, owner information, electronic key settings, and vehicle status data, within system 100. Network server 160, third party server 170, and database 180 may include network, cloud, and/or backup services. For example, in some embodiments, network server 160 may include a cloud computing service such as Microsoft Azure™ or Amazon Web Services™. Additional cloud-based wireless access solutions compatible with LTE (e.g., using the 3.5 GHz spectrum in the US) are contemplated. In some embodiments, third party server 170 may include a messaging or notification service, for example, that may notify or alert a registered user of at least one permission update to vehicle 130 through the cloud network.

Figure 2:
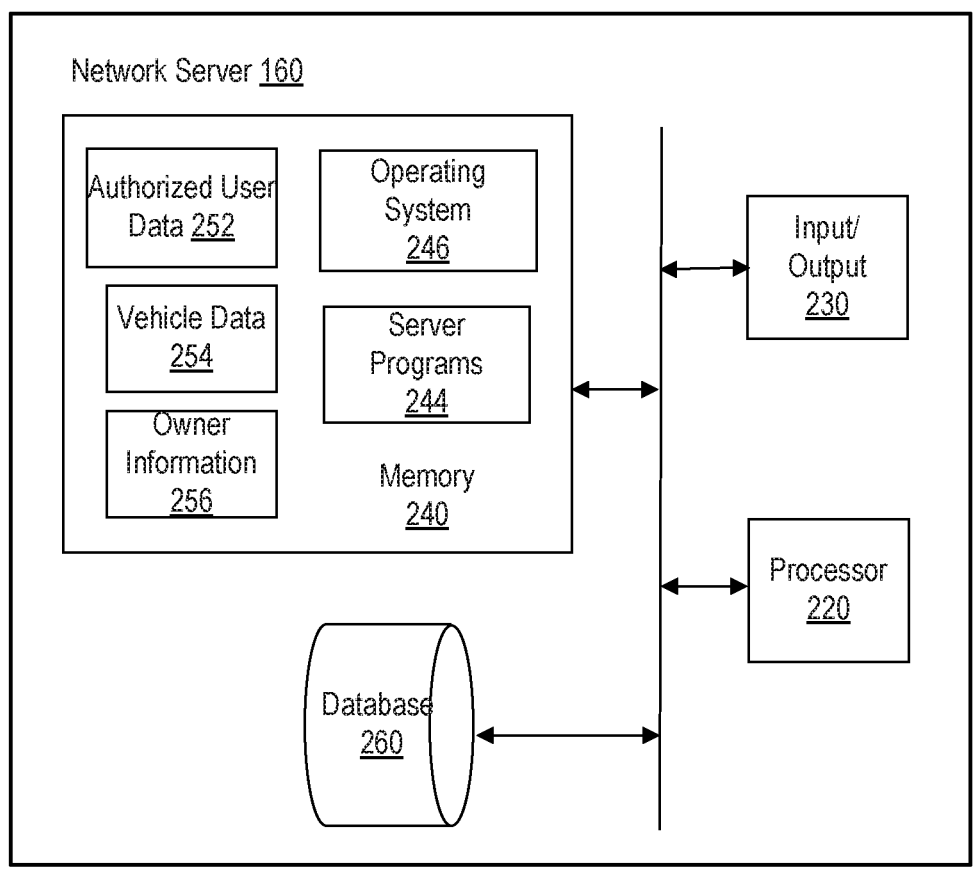
FIG. 2 is a schematic block diagram illustrating an exemplary network server, used in the exemplary system of FIG. 1.

FIG. 2 is a schematic block diagram illustrating an exemplary network server 160, used in exemplary system 100 of FIG. 1. It is contemplated that one or more personal devices 120 may include similar structures described in connection with network server 160. As shown in FIG. 2, network server 160 may include, among other things, a processor 220, personal/output (I/O) devices 230, memory 240, and a database 260, each coupled to one or more interconnected internal buses (not shown). Memory 240 may store among other things, server programs 244 and an operating system 246. Server programs 244 may be executed by cloud-based architecture or, alternatively, by a separate software program, such as an electronic key application (as further described with reference to FIGS. 4-13) for execution in network server 160. Software program 244 may be located in personal devices 120, or in alternative embodiments, in a vehicle controller (as described with reference to FIG. 3). Software program 244 may configure remote control of vehicle operations and/or permissions according to authorized user data, vehicle data, and owner information.

Memory 240 and/or database 260 may store authorized user data 252 based on individual and/or aggregate behavior of authorized users. Authorized user data 252 may be sent to an electronic key application that is executed on a personal device 120 by a vehicle owner. Memory 240 may also store other data and programs. Authorized user data 252 may include affiliated user login and/or other registration identification (ID) or user credentials, authentication timestamp information, network node or access point location(s) and/or preferences, and other metadata generated by algorithms in server programs 244. Memory 240 and/or database 260 may also store vehicle data 254 and owner information 256. Vehicle data 254 and owner information 256 may be sent to an electronic key application that is executed on a personal device 120 by a vehicle owner. Vehicle data 254 may include vehicle make, model, drive, drivers, speed limit, duration, drive mode, mileage, and/or any vehicle related information associated with vehicle 130, including vehicle permission information. Owner information 256 may include owner profile data, associated electronic keys created by one or more owners, and/or other historical data. Other vehicle data 254 and owner information 256 types may be contemplated.

Database 260 may include Microsoft SQL databases, SharePoint databases, Oracle™ databases, Sybase™ databases, or other relational databases. Memory 240 and database 260 may be implemented using any volatile or non-volatile memory including, for example, magnetic, semiconductor, tape, optical, removable, non-removable, or any other types of storage devices or computer-readable mediums.

I/O interfaces 230 may include not only network interface devices, but also user interface devices, such as one or more keyboards, mouse devices, and graphical user interfaces (GUIs) executed on personal devices 120. For example, GUIs may include a touch screen where a user may use his fingers to provide input, or a screen that can detect the operation of a stylus. Network server 160 may provide authorized user data 252, vehicle data 254, and owner information 256 for use in an electronic key application (as further described with reference to FIGS. 4-13) that is displayed and executed on a personal device 120 operated by a vehicle owner. Based on user input or user interaction with the GUI, network server 160 may receive authorized user data 252, vehicle data 254, and owner information 256 from network 150 through I/O device 230, and may analyze such data to control and/or restrict vehicle 130 permissions by generating/modifying and sending electronic keys. Network server 160 may store a copy of authorized user data 252, vehicle data 254, and owner information 256, for example, in memory 240, database 260, or in any other database accessible to server 160.

Figure 3:
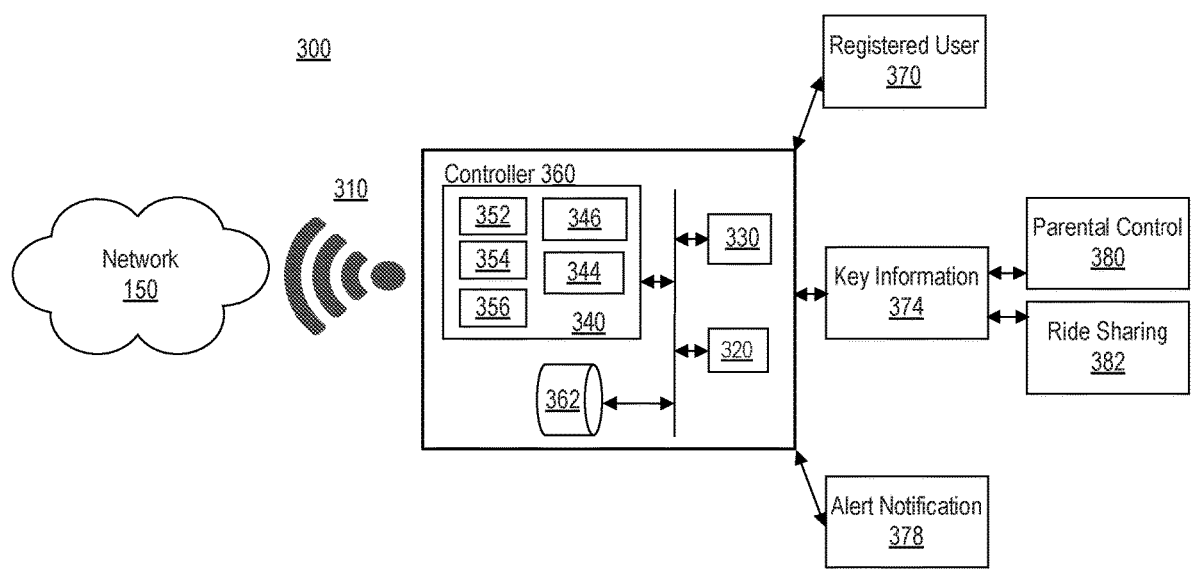
FIG. 3 is a schematic block diagram illustrating an exemplary vehicle controller, used in the exemplary system of FIG. 1.

FIG. 3 is a schematic block diagram illustrating an exemplary vehicle controller, used in the exemplary system of FIG. 1. As illustrated in FIG. 3, vehicle 130 may include a vehicle controller 360 capable of communicating with a transceiver 310 and personal device 120 executing an electronic key application through network 150. Transceiver 310 may be capable of receiving one or more vehicle permission instructions (further described with reference to FIGS. 4-13) from one or more personal devices 120 and/or cloud platform 190 over network 150. Transceiver 310 may be capable of transmitting authorized user data 352 from vehicle 130 to one or more personal devices 120 and/or cloud platform 190 over network 150. Controller 360 may transmit authorized user data 352, vehicle data 354, and owner information 356. 352, 354, and 356 may be stored in memory 340 and/or database 362. Controller 360 may include one or more processors 320, input/output 330, controller programs 344 and operating system 346. Controller 360 may function in a manner similar to network server 160 and may operate independently or cooperatively with network server 160. Controller 360 may be configured to receive vehicle owner instructions to control, send, and/or edit electronic key permissions. The vehicle owner may modify or edit electronic keys according to requests from one or more registered users 370 and based on key information 374 including parental controls 380 and ride sharing information 382. Controller 360 may receive or provide an alert notification 378.

Figure 4:
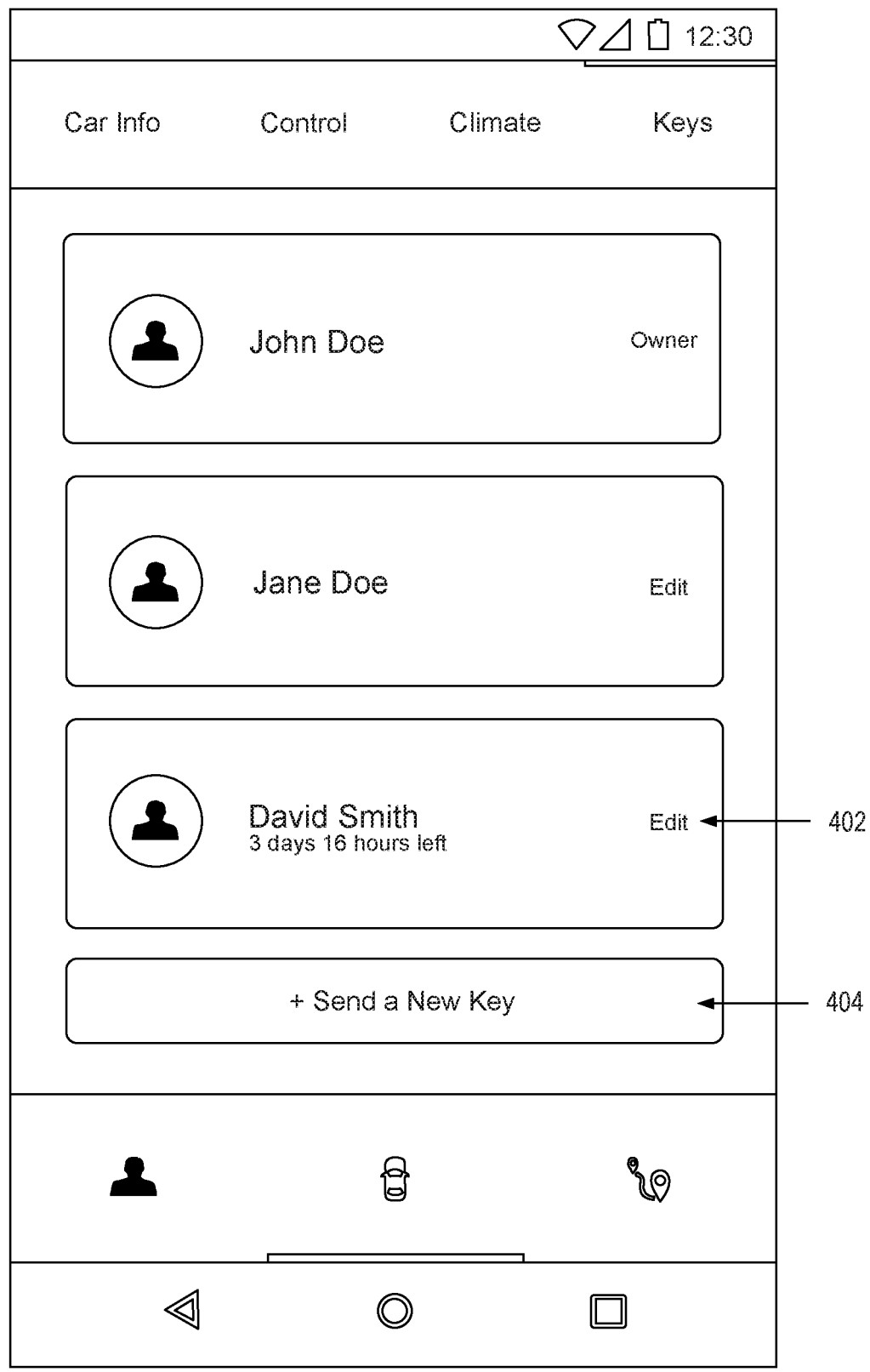
FIG. 4 is a diagrammatic illustration of an exemplary graphical user interface to edit an electronic key.

FIG. 4 is a diagrammatic illustration of an exemplary graphical user interface (GUI) to edit an electronic key. The GUI may be displayed as part of a screen on a personal device 120. FIG. 4 illustrates a home screen 400 including "Car Info," "Control," "Climate," and "Keys" options for user selection located at the top of the screen. In the illustration, the home screen also includes the option to edit an electronic key 402 for one or more registered users and to send a new electronic key 404. In FIG. 4, electronic keys visible for selection are "John Doe," "Jane Doe," and "David Smith." A touch screen button for the electronic key of "John Doe," the owner of the vehicle, does not include an option to edit. However, touch screen buttons for the electronic keys of authorized users "Jane Doe" and "David Smith" include an option to edit 402. A touch screen button to send a new electronic key 404, perhaps to a user not shown, is also illustrated. Electronic keys may also include a time limit for use, and expire after the time limit is up. For example, in the illustration, the electronic key for "David Smith," has 3 days and 16 hours left before it expires. Other home screens for an electronic key application that provide the option to edit and send keys are also contemplated. For example, the GUI may show different content or be arranged a different layout.

Figure 5:
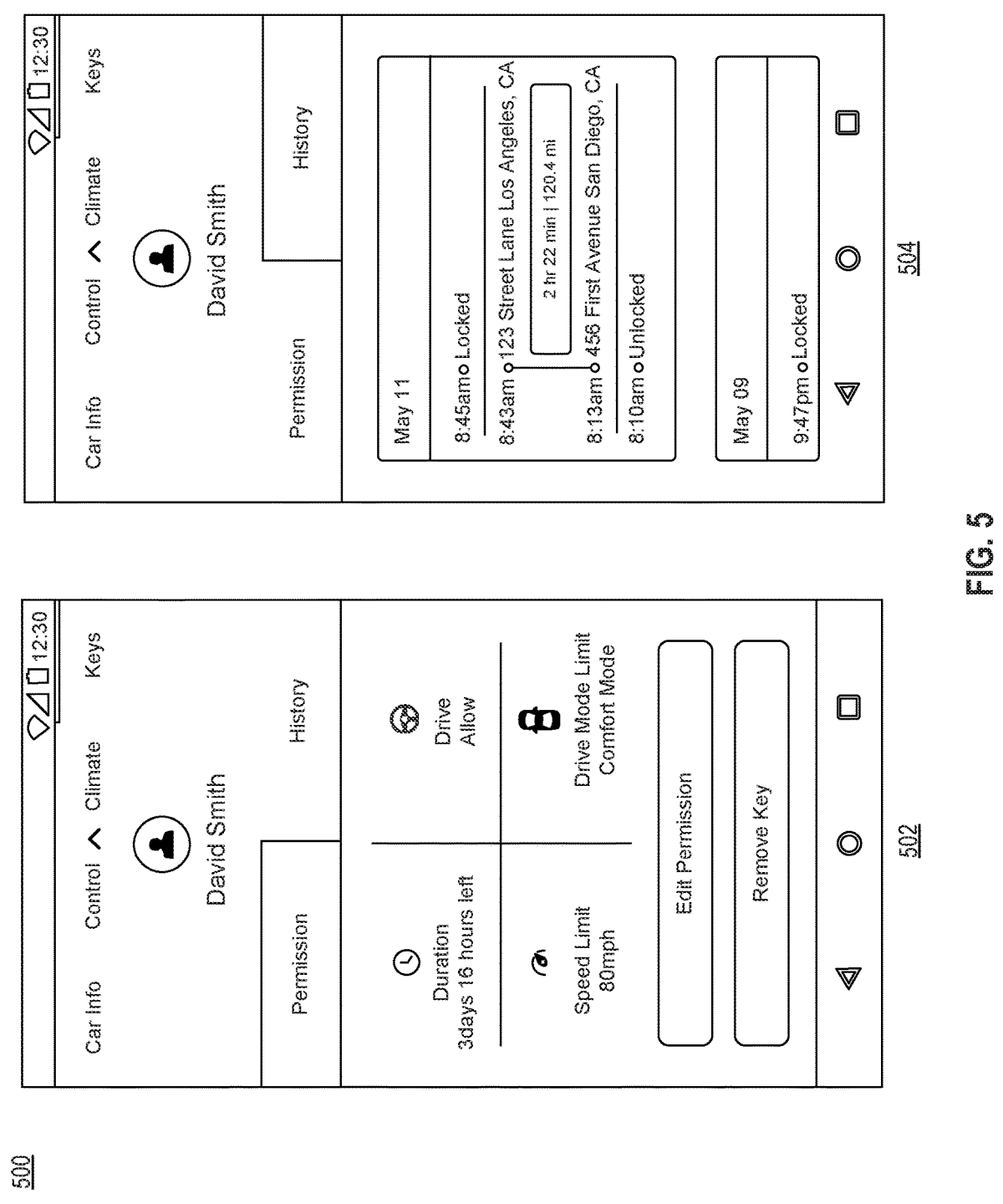

FIG. 5 is a diagrammatic illustration of exemplary graphical user interfaces (GUIs) showing a permission tab and a history tab of an electronic key for editing Based on user input or user selection to edit electronic key 402 of "David Smith," one or more editing screens 500 may be displayed for user modification and/or review. In the illustration, permission screen 502 displays touch screen buttons and tabs in order to modify vehicle access permissions for "David Smith." For example, vehicle permissions including permissions to allow driving, set drive duration, set speed limit, and set drive mode are shown. The user may touch the edit permission button to modify these permissions or may touch the remove key button to delete the electronic key entirely. The user may also touch or select the history tab to view history screen 504. In the illustration, history screen 504 displays historical date, time, location, and trip duration information according to "David Smith's" usage of the owner's vehicle. Additional historical information including vehicle operations such as "unlock" and "lock" events are shown. Other permission selection and historical information data capture is contemplated.

Figure 6:
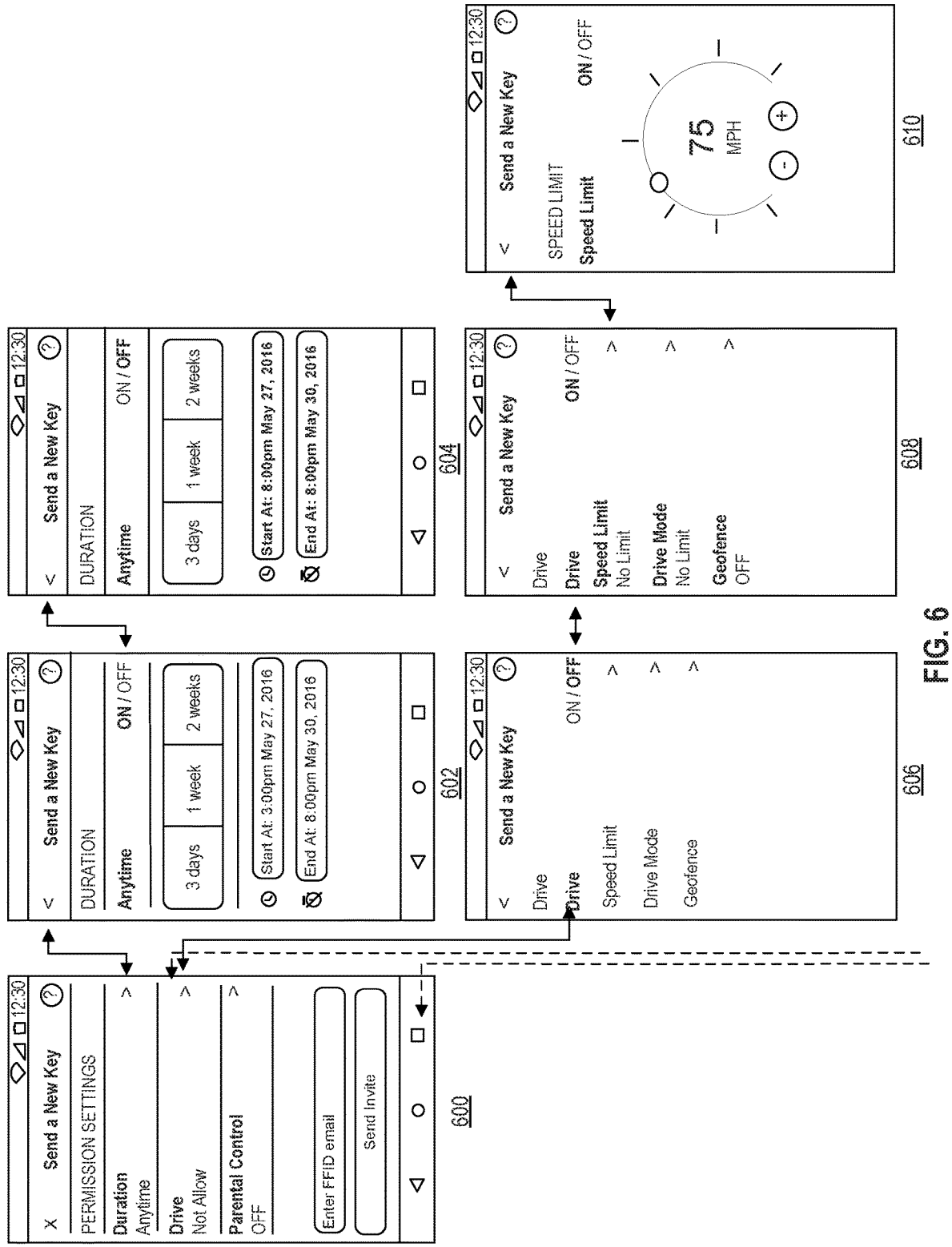
FIG. 6 is a diagrammatic illustration of exemplary graphical user interfaces used to generate an electronic key.

FIG. 6 is a diagrammatic illustration of exemplary graphical user interfaces used to generate an electronic key. Based on user input or user selection to send a new electronic key 404, one or more "send a new key" screens 600 may be displayed for user modification and/or review. In the illustration, duration, drive, and parental controls may be set, and a user email may be entered to send a corresponding email invitation/notification for electronic key use. When a user selects "duration," screen 602 displays a duration that can be "ON" for anytime, and is available for editing by a user. Screen 604 includes a duration that is "OFF" and fixed according to duration information that is provided. When a user selects "drive," screen 606 displays a drive permission that is set to "OFF," and screen 608 includes a drive permission that is set to "ON." When "ON" is selected by a user, permissions for speed limit, drive mode, and a geo-fence can be set. For example, in screen 610, a speed limit of 75 mph is set. Other "send a new key" screens 600, permission settings, and default scenarios are contemplated.

Figure 7:
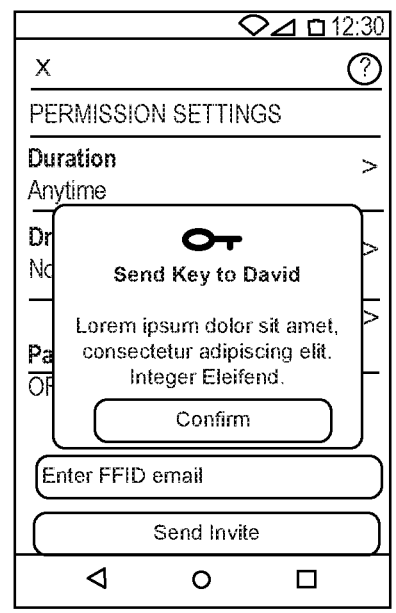
FIG. 7 is a diagrammatic illustration of exemplary graphical user interfaces used to send an electronic key.
Figure 7:
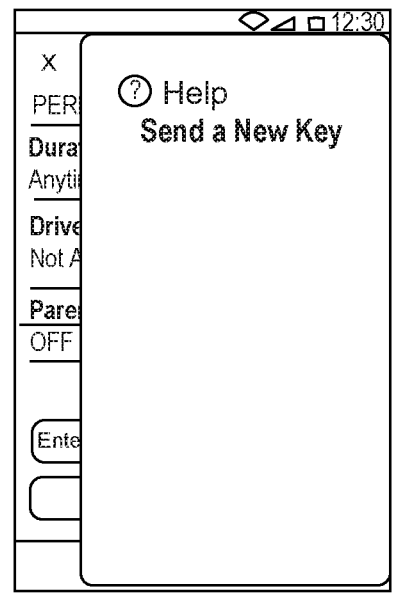

FIG. 7 is a diagrammatic illustration of exemplary graphical user interfaces (GUIs) used to send an electronic key. One or more "send" screens 700 may be displayed. In the illustration, screen 702 displays a pop-up box when a user selects the "send invite" button. The pop-up or dialog box provides a notification message to the user to confirm that a new electronic key may be sent to an authorized user. Screen 704 displays a pop-up or dialog box that provides help for a vehicle owner who may encounter difficulty in using the software application to send a new electronic key. For example, the help may include a list of frequently asked questions and associated answers relating to the electronic key application. Other uses for pop-up of dialog boxes may be contemplated, and may be provided to improve user interaction with the electronic key application GUI.

Figure 8:
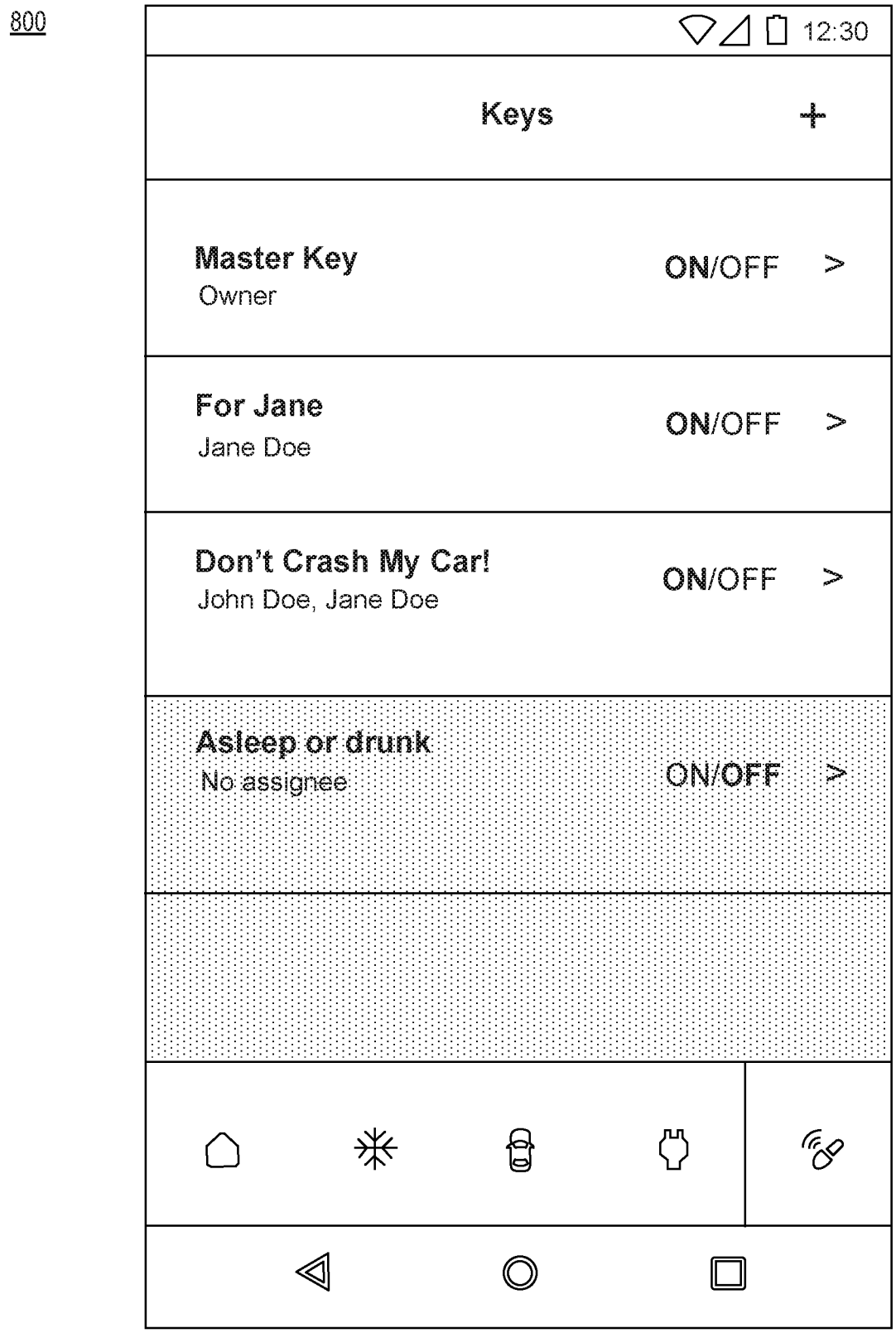
FIG. 8 is a diagrammatic illustration of an exemplary graphical user interface showing multiple generated electronic keys.

FIG. 8 is a diagrammatic illustration of an exemplary graphical user interface (GUI) showing multiple generated electronic keys. Screen 800 lists a "Master Key" for use by the owner, a "For Jane" key for use by "Jane Doe," a "Don't Crash My Car!" key for "John Doe" and "Jane Doe," and an "Asleep or drunk" key. In the illustration, electronic keys may be assigned to individual users, groups of users, or not assigned to any users. Electronic keys may also be assigned based on a particular category or scenario, and may be titled accordingly. For example, the "Don't Crash My Car!" electronic key may assign certain limited permissions so as to maximize the chances that "John Doe" and "Jane Doe" drive the vehicle owner's vehicle safely. Similarly, the "Asleep of drunk" key may assign permissions to enable a stranger user to operate the owner's vehicle when the owner is either asleep or drunk. This may include permissions to allow a stranger to drive the owner's vehicle 130 at night time. Other electronic key types, scenarios, and categories are contemplated.

Figure 9:
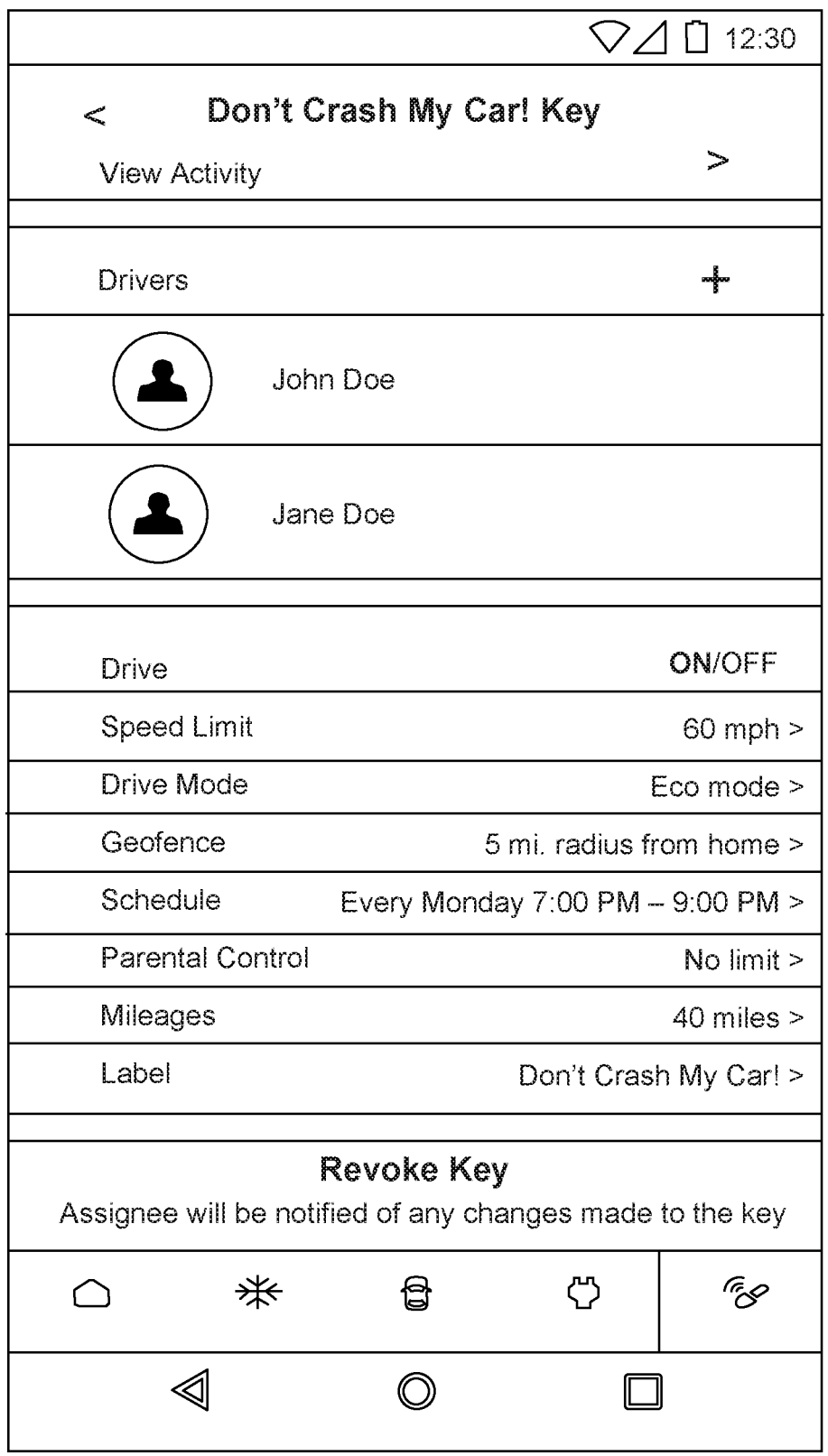
FIG. 9 is a diagrammatic illustration of an exemplary graphical user interface showing the settings of an electronic key.

FIG. 9 is a diagrammatic illustration of an exemplary graphical user interface showing the settings of an electronic key. When a user selects the "Don't Crash My Car!" key, the electronic key application may proceed to an editing screen 900. Screen 900 displays options to view activity, add or modify drivers, and alter drive, speed limit, drive mode, geo-fence, schedule, parental control, and mileage permissions for the electronic key. The electronic key may also be labeled, and the electronic key may be revoked, notifying the assignee of any changes made to the electronic key. Other editing screens and associated vehicle permissions for modifying a group electronic key are contemplated.

FIG. 10 is a diagrammatic illustration of an exemplary graphical user interface (GUI) showing activities associated with an electronic key. When a user selects to "View Activity," the electronic key application may display activity screen 1000. In the illustration, view activity screen 1000 displays current and/or historical date, time, location, and trip duration information according to both "John Doe" and "Jane Doe's" usage of the owner's vehicle. Additional information including "unlock" and "lock" vehicle operations is shown. Other displays of viewed activity including trip information and associated metadata are contemplated.

Figure 11:
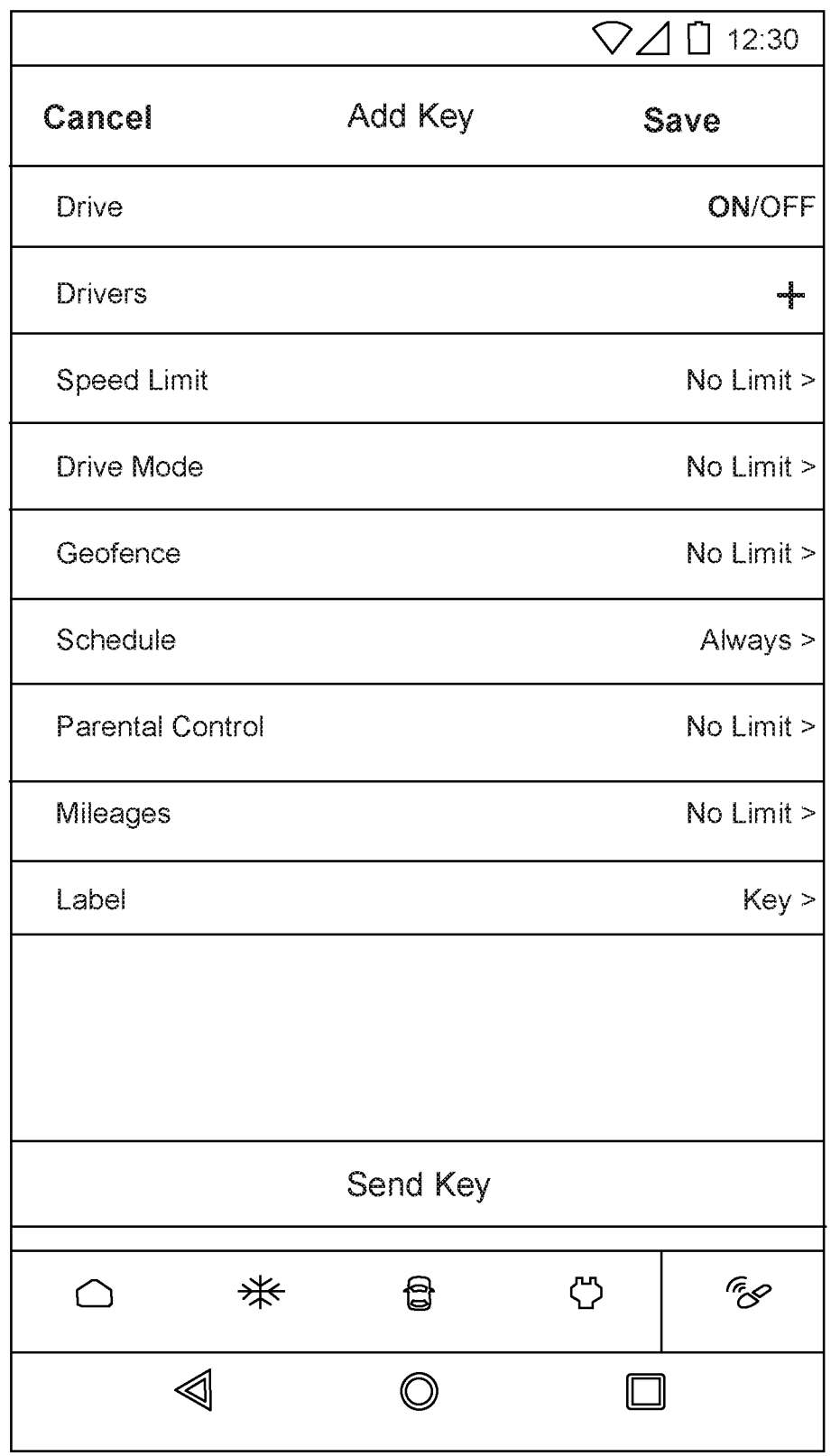
FIG. 11 is a diagrammatic illustration of an exemplary graphical user interface to add an electronic key.

FIG. 11 is a diagrammatic illustration of an exemplary graphical user interface to add an electronic key. Screen 1100 is used for adding a key. Screen 1100 includes options to alter drive, drivers, speed limit, drive mode, geo-fence, schedule, parental control, and mileage permissions. The electronic key may be labeled and also sent to an authorized user upon touch of the "send" key button. Other screens for adding and subsequently sending electronic keys and setting associated vehicle permissions are contemplated.

Figure 12:
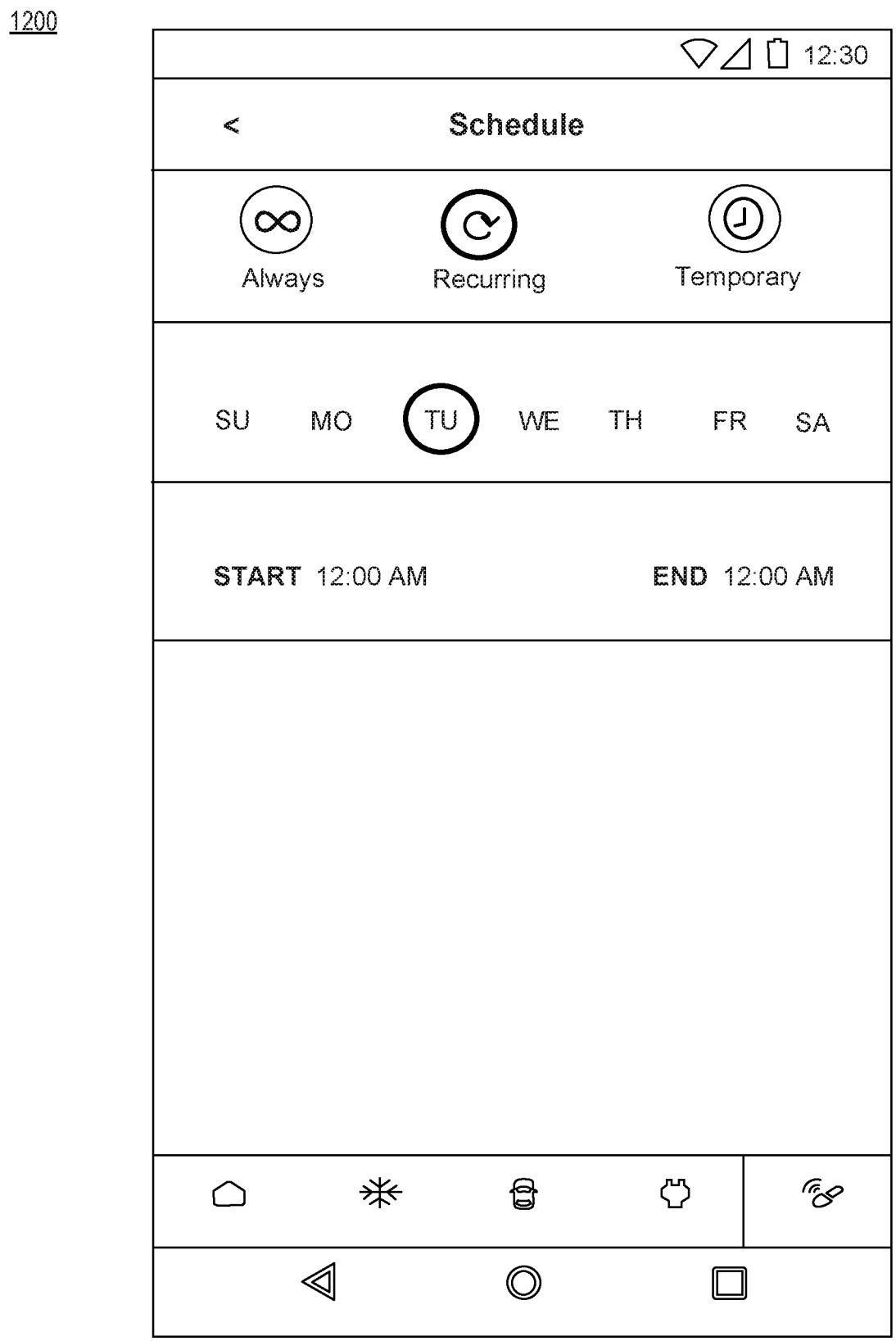
FIG. 12 is a diagrammatic illustration of an exemplary graphical user interface showing the schedule of an electronic key.

FIG. 12 is a diagrammatic illustration of an exemplary graphical user interface showing the schedule of an electronic key. When a user selects "Schedule," the electronic key application proceeds to the schedule screen 1200. Schedule screen 1200 may include options for always permitting electronic key access, on a recurring basis, or for a temporary time period. Specific days of the week permitting electronic key access may be set, and specific times permitting electronic key access may also be set. Other screens and schedule options for setting electronic key vehicle permissions according to a particular predetermined schedule are contemplated.

Figure 13:
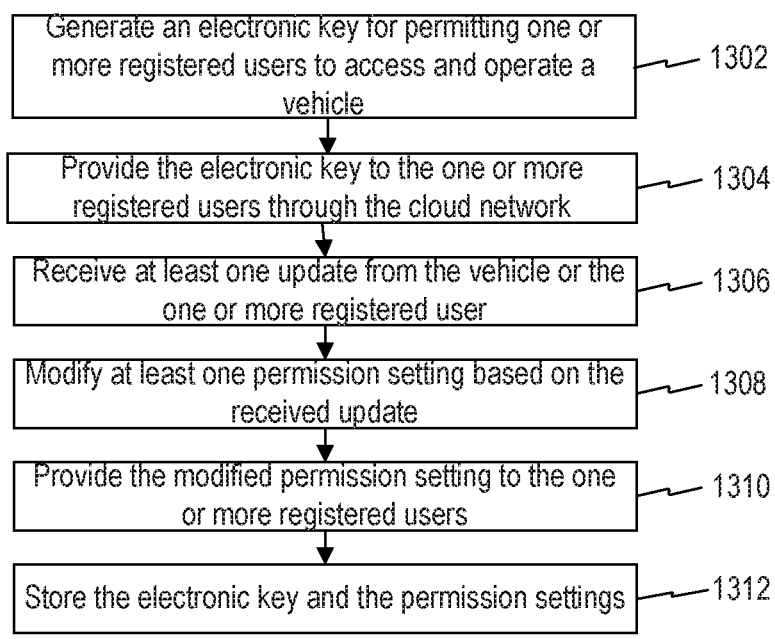
FIG. 13 is a flow chart illustrating an exemplary process performed by the exemplary system in FIG. 1, in accordance with the disclosed embodiments.

FIG. 13 is a flow chart illustrating an exemplary process that one or more processors may perform in accordance with the disclosed embodiments. While the exemplary process 1300 is described herein as a series of steps, it is to be understood that the order of the steps may vary in other implementations. In particular, steps may be performed in any order, or in parallel. One or more processors 320 may include processors in network server 160 and/or processors in personal device 120. In other words, each step of process 1300 may be performed by network server 160 or alternatively, by personal device 120. For example, some steps of process 700 may be performed by one processor while some other steps may be performed by another processor. Furthermore, while the exemplary process 1300 is described with respect to controlling vehicle permissions based on sending or editing electronic keys at a personal device 120, other processes may be contemplated.

At step 1302, process 1300 may include generating an electronic key for permitting one or more registered users to access and operate a vehicle. The electronic key may be generated by a vehicle owner using the electronic key application GUI to add, configure, and send a new electric key. Based on user input or user interaction modifying and/or generating keys, network server 160 may receive authorized user data 252, vehicle data 254, and owner information 256 from network 150 through I/O device 230, such as an electronic key application GUI on personal device 120, and may analyze such data to control and/or restrict vehicle 130 permissions. The vehicle owner may specify permission options including drive, drivers, speed limit, drive mode, geo-fence, schedule, parental control, and mileage permissions for registered users (as described with reference to FIG. 11). The vehicle owner may also assign the electronic key to multiple registered users (as described with reference to FIG. 8). One or more processors 220 may also be configured to associate the electronic key with the one or more registered users based on key information including at least one of parental control, ride sharing, time, price, or schedule. For example, the electronic key may be associated with the users' FF ID. Accordingly, a vehicle owner may profit from giving users access to his or her vehicle by generating an electronic key.

At step 1304, process 1300 may include providing the electronic key to the one or more registered users through the cloud network. Upon selection of authorized users and setting of permissions, the vehicle owner may send a new key (as described with reference to FIGS. 6 and 11). System 100 may allow for one or more personal devices 120 to transfer electronic keys associated with an electronic key application over network 150 to cloud platform 190 and/or vehicle 130. Transceiver 310 may also be capable of transmitting authorized user data 352 from vehicle 130 to one or more personal devices 120 and/or cloud platform 190 over network 150. One or more processors 320 may also be configured to operate a vehicle sensor to identify and authenticate one or more registered users before permitting authorized users to access and operate vehicle 130. Upon providing an electronic key according to successful authentication, one or more processors 220 may be configured to provide the electronic key and monitor real-time movements of vehicle 130.

At step 1306, process 1300 may include receiving at least one update from vehicle 130 or one or more registered users. The update may include one or more authorized users violating predetermined permissions. For example, a vehicle owner may receive an email alert that an authorized user is exceeding a predetermined speed limit permission associated with the authorized user's electronic key. Similarly, a vehicle owner may receive a text message from the electronic key application indicating an authorized user has complied with all permissions associated with an electronic key during recent use of the owner's vehicle 130. This update or alert may be received periodically, regularly, or only when a permission setting is violated. An update may also be sent when an authorized user edits permissions of an electronic key using the electronic key application. The update may also include navigational data associated with operation of vehicle 130 by one or more authorized users, and network server 160 one or more personal devices 120 may be configured to modify a permission setting associated with an electronic key based on the update. The update may include a request from one or more registered users, and one or more processors 220 may be configured to modify the permission setting associated with the electronic key based on the request. Navigational data may include one or more of a drive duration, speed, or drive trajectory. Other update mechanisms may be contemplated.

At step 1308, process 1300 may include modifying at least one permission setting based on the received update. Authorized user vehicle data 354 and owner information 356 may be sent to an electronic key application that is executed on a personal device 120 by a vehicle owner. The vehicle owner may then modify vehicle permissions including drive, drivers, speed limit, drive mode, geo-fence, schedule, parental control, and mileage permissions for registered users (as described with reference to FIGS. 4-13). Additionally, one or more processors 320 may be configured to autonomously operate or cease operation of vehicle 130 if any of the permission settings are violated by vehicle 130. Further, as a user obeys permissions according to electronic key restrictions, the authorized user may be assigned a rating or score, and as the rating or score is increased over time and surpasses a threshold, based on user historical data (as described with reference to FIG. 5), the user may automatically be given access to additional keys and/or vehicle permissions. Modifying a permission may also include setting a first permission different from a second permission, wherein when an owner is notified of a violation of a first permission, a second permission may be reduced or restricted. Other permission setting modifications and mechanisms based on received updates may be contemplated.

In steps 1306 and 1308, one or more processors 220 may receive updates and modify vehicle permissions on the electronic key based on the update in real-time. Updates may also be received and the key may be modified periodically.

At step 1310, process 1300 may include providing the modified permission setting to the one or more registered users. In some embodiments, the modified permissions may be sent to personal device 120 of the registered user and/or vehicle 130, where they are integrated into the electronic key. In some alternative embodiments, the modified permission may be integrated to the electronic key on personal device 120 of the owner, and then the updated key may be sent to personal device 120 of the registered user and/or vehicle 130 to replace the existing key on that device. The modified permissions may also be provided in the form of an alert or message sent to the vehicle operator, notifying of a change in permissions. Any user who has access to the electronic key application may send or access a key request to a vehicle owner by specifying desired customizations. An owner can edit pre-customized key request and send back or provide the electronic key with the modified permission settings to one or more registered users. Other means for providing modified permission settings are contemplated.

At step 1312, process 1300 may include storing the electronic key and the permission settings. In particular, network server 160 may store a copy of the electronic key and any modified permission setting, for example, in memory 240, database 260, or in any other database accessible to network server 160. Similarly, personal device 120 may store storing the electronic key and the permission settings in memory 240 or database 260. Other storage means are contemplated.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for remotely granting vehicle permissions over a cloud network, the system comprising:
   one or more processors connected to the cloud network and configured to:
      generate an electronic key including a plurality of permission settings that are not specific to any particular user, the plurality of permission settings, when met, permitting any user to operate the vehicle;
      provide the electronic key to the one or more users through the cloud network;
      receive at least one update from the vehicle through the cloud network;
      modify at least one permission setting associated with the electronic key based on the received update; and
      provide the modified permission setting to the one or more users through the cloud network; and
   a storage device configured to store the electronic key and the permission settings.

2. The system of claim 1, wherein the at least one update includes navigational data associated with operation of the vehicle by the one or more users, and
   wherein the one or more processors are further configured to modify the at least one permission setting associated with the electronic key based on the navigational data.

3. The system of claim 1, wherein the at least one update includes a request from one or more users, and
   wherein the one or more processors are further configured to modify the at least one permission setting associated with the electronic key based on the request.

4. The system of claim 2, wherein the navigational data includes one or more of a drive duration, speed, or drive trajectory.

5. The system of claim 1, wherein the plurality of permission settings maximize a chance that any driver drive the vehicle safely.

6. The system of claim 1, wherein the at least one permission setting includes one or more of a drive duration, speed limit, drive mode, or geo-fence.

7. The system of claim 1, wherein the one or more processors are further configured to monitor real-time movements of the vehicle.

8. The system of claim 7, wherein the one or more processors are further configured to autonomously operate or cease operation of the vehicle if any of the permission settings are violated by the vehicle.

9. The system of claim 1, wherein the plurality of permission settings relates to a status of an owner of the vehicle.

10. A method for remotely granting vehicle permissions over a cloud network, performed by one or more processors connected to the cloud network, the method comprising:
   generating an electronic key including a plurality of permission settings that are not specific to any particular user, the plurality of permission settings, when met, permitting any user to operate the vehicle;
   providing the electronic key to the one or more users through the cloud network;
   receiving at least one update from the vehicle through the cloud network;
   modifying at least one permission setting associated with the electronic key based on the received update;
   providing the modified permission setting to the one or more users through the cloud network; and storing the electronic key and the permission settings.

11. The method of claim 10, wherein the at least one update includes navigational data associated with operation of the vehicle by the one or more users, and further comprising: modifying the at least one permission setting associated with the electronic key based on the navigational data.

12. The method of claim 10, wherein the at least one update includes a request from one or more users, and further comprising: modifying the at least one permission setting associated with the electronic key based on the request.

13. The method of claim 11, wherein the navigational data includes one or more of a drive duration, speed, or drive trajectory.

14. The method of claim 10, further comprising: associating the electronic key with the one or more users based on key information including at least one of parental control, ride sharing, time, price, or schedule.

15. The method of claim 10, wherein the at least one permission setting includes one or more of a drive duration, speed limit, drive mode, or geo-fence.

16. The method of claim 10, further comprising: monitoring real-time movements of the vehicle.

17. The method of claim 16, further comprising: autonomously operating or ceasing operation of the vehicle if any of the permission settings are violated by the vehicle.

18. The method of claim 10, wherein the plurality of permission settings relates to a status of an owner of the vehicle.

19. A non-transitory computer-readable medium storing instructions executable by one or more processors to perform a method for remotely granting vehicle permissions over a cloud network, the method comprising:
   generating an electronic key including a plurality of permission settings that are not specific to any particular user, the plurality of permission settings, when met, permitting any user to operate the vehicle;
   providing the electronic key to the one or more users through the cloud network;
   receiving at least one update from the vehicle through the cloud network;
   modifying at least one permission setting associated with the electronic key based on the received update;
   providing the modified permission setting to the one or more users through the cloud network; and
   storing the electronic key and the permission settings.

20. The non-transitory computer-readable medium of claim 19, wherein the at least one update includes navigational data associated with operation of the vehicle by the one or more users, and further comprising: modifying the at least one permission setting associated with the electronic key based on the navigational data.

* * * * *